(12) United States Patent
Ervin

(10) Patent No.: US 6,921,120 B1
(45) Date of Patent: Jul. 26, 2005

(54) CARGO EXTENSION APPARATUS FOR MOTOR VEHICLE

(76) Inventor: David R. Ervin, 14453 Loxahatchee 73rd St., North Loxahatchee, FL (US) 33470

(*) Notice: Subject to any disclaimer, the term of this patent is extended or adjusted under 35 U.S.C. 154(b) by 0 days.

(21) Appl. No.: 10/428,248

(22) Filed: May 2, 2003

(51) Int. Cl.$^7$ .................................................. B60P 1/00
(52) U.S. Cl. ................................ 296/26.02; 296/26.09; 296/26.05; 296/26.07
(58) Field of Search ........................... 296/26.04–26.09, 296/26.02, 26.1, 26.11; 414/522

(56) References Cited

U.S. PATENT DOCUMENTS

| | | | | |
|---|---|---|---|---|
| 5,016,858 A | * | 5/1991 | Mitchell | 254/45 |
| 5,054,578 A | * | 10/1991 | Smillie et al. | 182/69.4 |
| 5,649,731 A | * | 7/1997 | Tognetti | 296/26.09 |
| 5,829,945 A | * | 11/1998 | Stanley | 414/477 |
| 5,938,262 A | | 8/1999 | Mills | 296/26.09 |
| 6,065,792 A | | 5/2000 | Sciullo et al. | 296/26.09 |
| 6,464,274 B2 | | 10/2002 | Mink | 296/26.09 |
| 6,592,319 B2 | * | 7/2003 | Berger | 414/522 |
| 6,659,524 B1 | * | 12/2003 | Carlson | 296/26.09 |

* cited by examiner

Primary Examiner—Stephen Gordon
(74) Attorney, Agent, or Firm—Norman Friedland

(57) ABSTRACT

The load carrying capability of a bed of a truck or the back of an SUV is increased by length and weight of the load by including a platform that is movable to the height of the wheel well so that a load that measures say, 4'×8' fits above the wheel well so that the limited space between wheel wells do not impair the load and the wheel wells absorb part of the load. In one embodiment a camming arrangement with a guide rail cam and roller followers attached to the platform place the platform in sliding relationship and raises the platform as it slides rearwardly. In another embodiment a foldable linkage is utilized to raise the platform. Jack can be employed to raise the platform and a brake is added prevent the platform from moving backwards once deployed.

3 Claims, 6 Drawing Sheets

US 6,921,120 B1

CARGO EXTENSION APPARATUS FOR MOTOR VEHICLE

TECHNICAL FIELD

This invention relates to apparatus for extending the carrying capacity of a truck or sports utility vehicle or the like, and particularly to provide a platform that serves to permit a wider, longer load and/or enhance the load carrying capability of the platform.

BACKGROUND OF THE INVENTION

As is well known in the automotive technology, the size of the beds of trucks vary considerably and there is a recent trend, although subject to change, where the beds are made shorter than was heretofore the case such that the length is as short as 4–6.5 feet ('). Obviously, this has an adverse affect on the truck's ability to haul large loads, as for example, sheets of sheet rock, ply wood, etc that measures say, 4'×8'.

There are a number of devices that are on the market and described in the literature that address this problem. One such device, for example, is a tiered bracket that is pivotally mounted at the end of the truck bed that allows one to slide the large cargo through one of the gates defined by the tiered brackets where the cargo rests on the front end of the bed and on the gate bracket at the aft end of the bed. Other concepts include a platform that extends between the wheel wells of the truck bed and is extendable toward the rear of the bed, so that when the tailgate is deployed, the platform extends over the tailgate and effectively increases the cargo capacity of the bed. In other configurations the tailgate is utilized to provide the support for the load by leaving the tailgate in the upright position and allowing the load to extend thereover.

One of the problems is that the devices provided heretofore or described in the literature are limited to the amount of load carrying capacity they can provide. Also, since it is abundantly important that the center of gravity of the load is not situated where the load can tip, the structure must be such that the center of gravity is such that the load does not become dislodged from the bed or that the air current does not get under the load and dislodge it which, obviously, could lead to disastrous results.

I have found that I can provide a movable platform that obviates the heretofore known problems, as for example, when the load carrying structure of my invention is deployed it enhances the load carrying capacity of the platform and when utilized in a truck bed or SUV it increases the width of load carrying capacity thereof so as to allow for wider objects to be carried thereby. In accordance with this invention I provide a platform that normally lies flat on the bottom of the bed and includes either a camming arrangement or a foldable linkage system that allows the platform to be guided into position so that its height is equal to the top surface of the wheel well of the vehicle when deployed. Hence, the platform in this arrangement together with the wheel well support the load and since the wheel well is grounded with the structure of the vehicle the load carrying capacity of the platform is enhanced. When the invention is utilized in an SUV or other similar type of vehicle, since the platform raises to the level of the wheel well, the load is over the wheel well so that the width is not impaired by the width between the wheel wells. This configuration permits carrying a wider load than would otherwise could be carried, in addition to allowing the wheel wells to enhance the load capacity.

SUMMARY OF THE INVENTION

An object of this invention is to provide for the bed of a truck, van or SUV or the like, a platform that is positioned to the level of the wheel well so that the wheel well participates in supporting the load being carried by the platform.

A feature of this invention is a platform having a wide portion and narrow portion that lies on the bottom of the bed with the narrow portion nested between the wheel well and providing a camming arrangement to synchronously slide and raise the platform so that it is level with the top surface of the wheel well. A slidable extension can be included on the aft end of the platform to further extend the load carrying capacity.

Another embodiment of this invention is that the platform includes foldable links mounted in the bed of a truck that unfolds to raise the platform to the level of the wheel well without the necessity of sliding the platform.

And still another embodiment is a foldable frame for supporting the platform in the deployed position with the use of a cross link arrangement and a jack or other raising mechanism can be employed to effectuated the raising of the platform.

The foregoing and other features of the present invention will become more apparent from the following description and accompanying drawings.

DETAILED DESCRIPTION OF THE INVENTION

Figure 1:
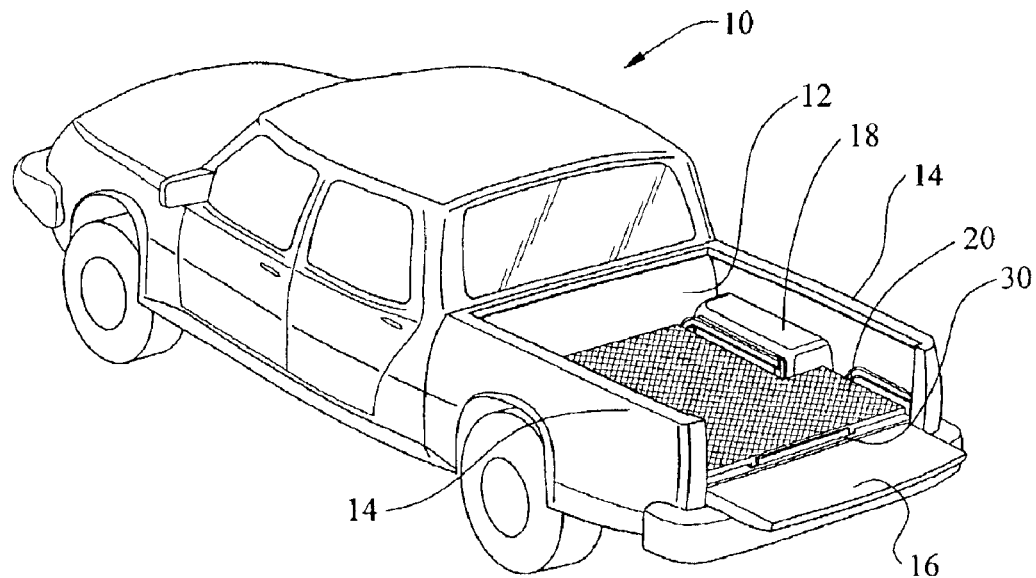
FIG. 1 is a perspective view of a truck with the platform of this invention being in the stacked position.
Figure 2:
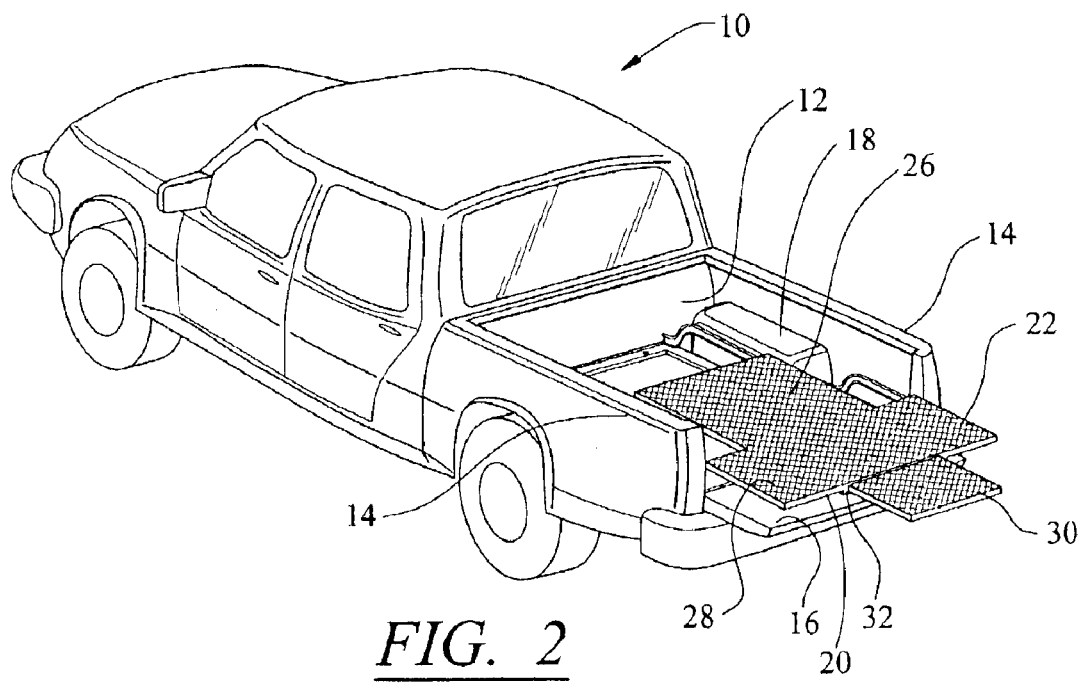
FIG. 2 is a perspective view showing the inventive platform of FIG. 1 being deployed.
Figure 3:
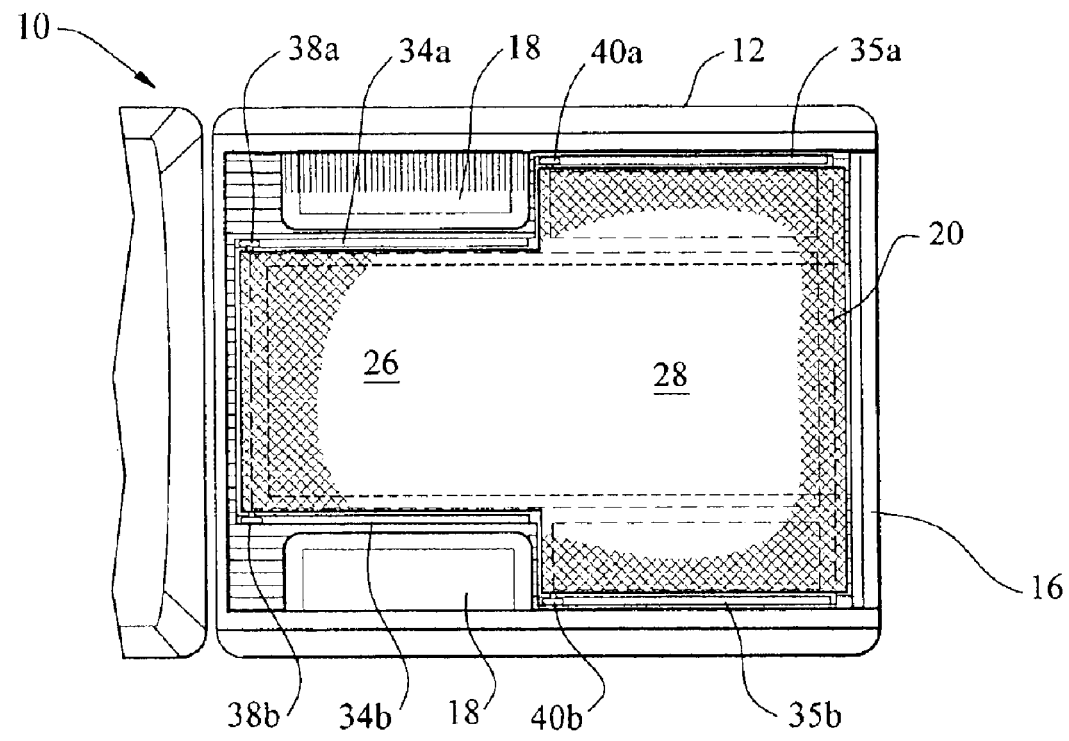
FIG. 3 is a partial plan view illustrating the top view of the platform of FIG. 1.
Figure 4:
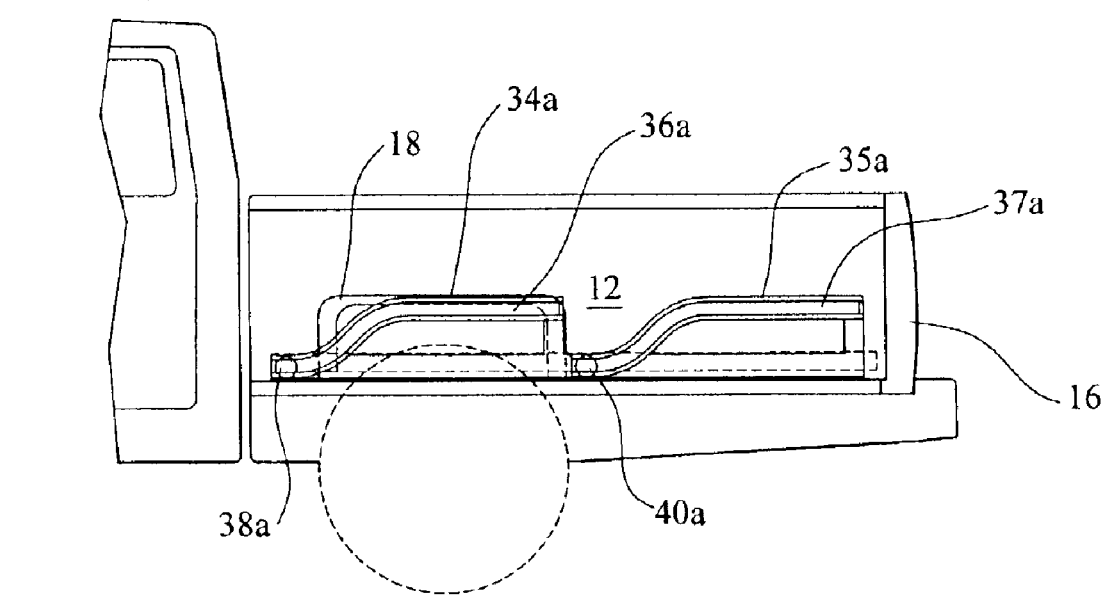
FIG. 4 is a partial view with the side panel of the truck bed removed to show the camming arrangement of the mechanism used to deploy the platform of FIG. 1.
Figure 5:
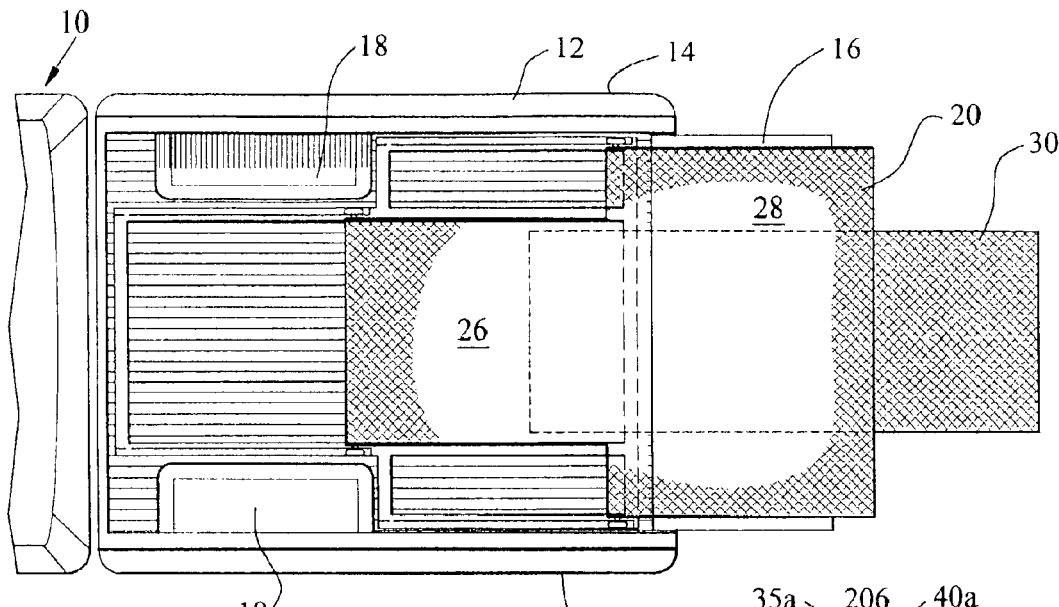
FIG. 5 is a fragmentary view showing the platform of FIG. 1 being deployed and the rear extension also being deployed.

As will become obvious from the description of the preferred embodiments of this invention, there are numerous way in which to execute this invention. Suffice it to say that the invention is essentially a load carrying structure that includes the wheel well of the vehicle as part of the load carrying structure and by the nature of the invention the width of the truck bed or SUV is not limited by the space between the wheel wells.

The invention is best understood by referring to FIGS. 1–6 which illustrate a well known commercially available truck generally indicated by reference numeral 10 having a bed 12 having the side panels 14, tail gate 16 and the pair of wheel wells 18. In accordance with this invention the load carrying platform 20 is slidably mounted in the bed 12 and as will be described hereinbelow is slidable toward the aft end of the bed 12 and a cam arrangement raises the platform 20 to the level of the wheel wells 18 when it is fully deployed. The platform 20 in this embodiment is a planar member 22 having a wide portion 28 and a narrow portion 26 formed in a shape of a T. The narrower portion 26 is sufficiently wide to fit between the wheel wells 18 and the wider portion 28 fits between the side panels 12. Obviously, the shape of this platform can take any other configurations and is not limited to this particular configuration. It may also include a slidable extension 30 at the aft end of wider portion 28 that is supported by spaced rails 32 or a slot carried by the wider portion 28. A pair of opposing guide rails 34a, 34b, 35a and 35b are slotted at 36a, 36b, 37a and 37b, respectively and serve to guide the rollers 38a, 38b, 40a and 40b and in the manner of a cam and follower, the rollers 38a, 38b, 40a and 40b are suitably supported on the narrow portion 26 and wide portion 28 respectively.

As is apparent from the foregoing, when the platform is pulled outwardly toward the aft position the camming action will cause the platform 20 to raise so as to be at the same height as the wheel wells 18. Obviously, when a load, such as a 4'×8' sheet is being hauled it will rest between the side panels 12 above the wheel wells 18 in such a manner that the load from the sheet will be transmitted to the wheel wells 18, thus taking advantage of the structure of the truck to support the load. As mentioned in the above paragraphs since the truck bed is shorter than what has been the customary size with a limited load carrying capability, this invention is particularly efficacious for these types of vehicles. It will be appreciated that when this structure is mounted in a SUV the limited width between wheel wells is taken out of play and the maximum width of the SUV can be utilized.

Figure 6A:
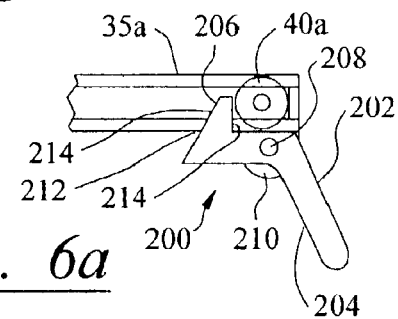
FIG. 6a is a fragmentary view in elevation illustrating a brake that is utilized to prevent the platform from moving when deployed.
Figure 6:
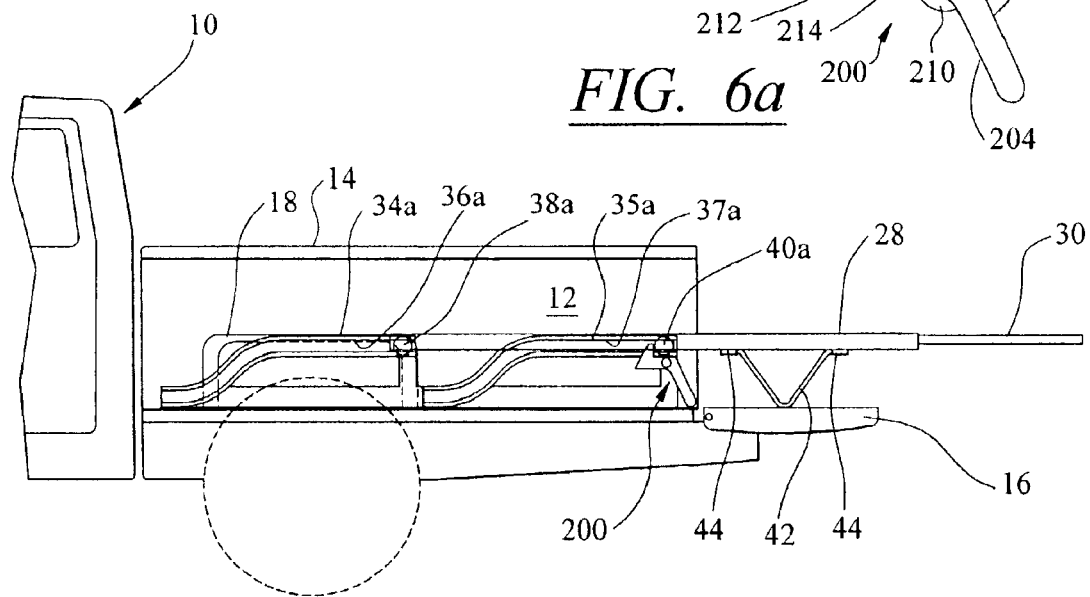
FIG. 6 is a fragmentary view in side elevation showing the side view of the platform in FIG. 5 and the bracket arrangement for supporting the aft end.

FIG. 6 illustrates the use of a leg or pair of legs 42 that are pivotally mounted on the underside of the wide portion 28 by the trunnions 44 and when deployed the bottom portion of the V-shaped leg 42 rests on the top surface of the tail gate 16 which contributes to the load carrying capacity of the platform 20. It is also apparent from these FIGS. 1–6 that while the top surface of platform 20 serves to carry the wide loads, the space under the platform is available to carry narrower loads. Also, it will be appreciated that the hardware required in this invention takes up very little room in the bed when the platform is placed in the stored position.

FIG. 6 illustrates the use of a leg or pair of legs 42 that are pivotally mounted on the underside of the wide portion 28 by the trunnions 44 and when deployed the bottom portion of the V-shaped leg 42 rests on the top surface of the tail gate 16 which contributes to the load carrying capacity of the platform 20. It is also apparent from these FIGS. 1–6 that while the top surface of platform 20 serves to carry the wide loads, the space under the platform is available to carry narrower loads. Also, it will be appreciated that the hardware required in this invention takes up very little room in the bed when the platform is placed in the stored position.

FIG. 6a illustrates a suitable brake that can be utilized in connection with the embodiment depicted in FIG. 1 and this brake merely exemplifies any type of brake that can prevent the platform from moving once deployed without departing from the scope of this invention. In this embodiment the brake generally illustrated by reference numeral 200 consist of a bell crank arrangement 202 with a lever arm 204 adapted to rotate the brake portion 206 about pivot 208 which is supported to the depending portion or boss 210 formed on the bottom of the guide rail 35b. The braking portion 206 travels through slot 212 formed on the bottom of the guide rail 35b and includes a beveled front end portion 214 that forces the bell crank to pivot about pivot 208 when the roller 40a passes there-over so as to allow the roller to pass the shoulder 214 to the position shown in FIG. 6. From the foregoing it is apparent that shoulder 214 prevents the roller 40a from moving forwardly until the lever 202 is depressed so as to releases the brake 206. Obviously, the brake 206 can take many forms, as for example, a removable pin placed through a slot formed in the platform adjacent the roller, or the insertion of a wedge or the like.

Figure 7A:
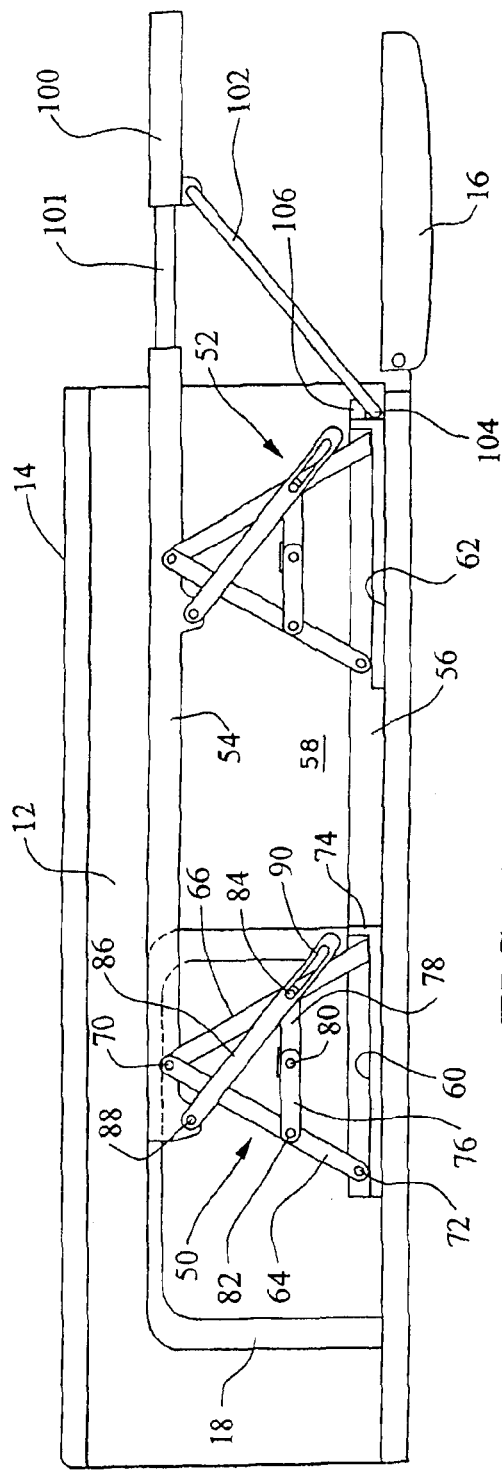
FIG. 7a is a schematic illustration of a foldable platform in the deployed position including a linkage system for raising and lowering the platform.
Figure 7B:
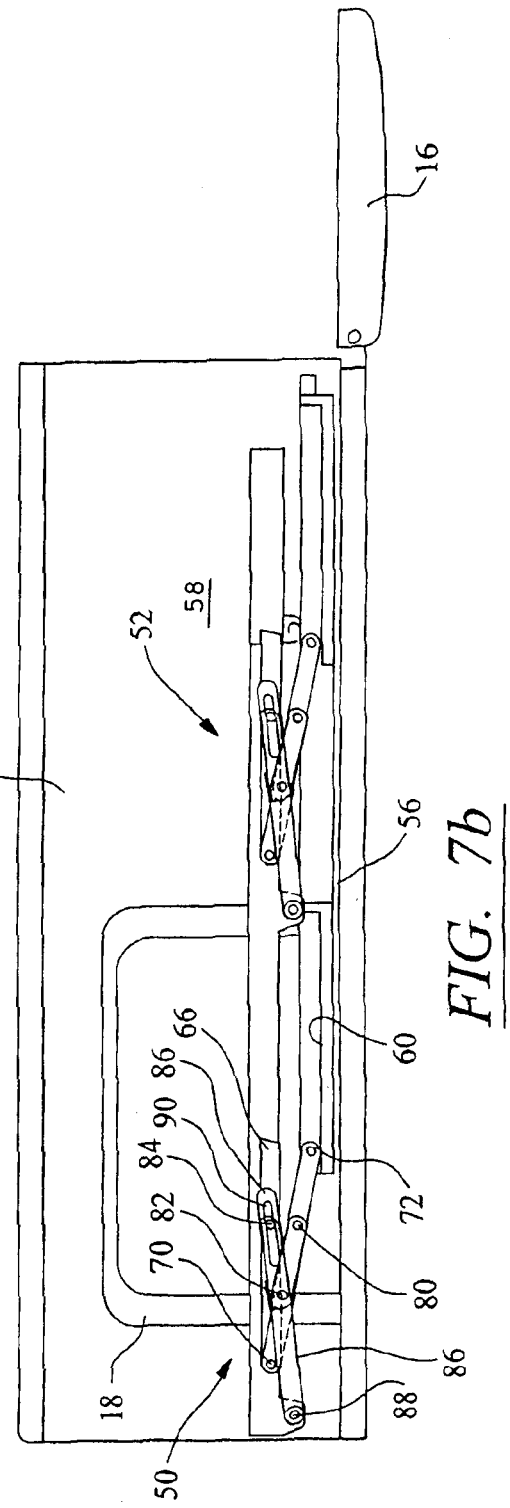
FIG. 7b is a schematic of the structure depicted in FIG. 7a illustrating the stored position.

FIGS. 7a and 7b exemplify another embodiment of this invention where the platform 54 is supported by a linkage arrangement consisting to the A-frame linkages generally illustrated by reference numerals 50 and 52 noting that similar linkages are mounted on opposite sides of the platform 54. In this configuration a support rail 56 is suitably attached to the floor 58 of the bed 12 and includes opposite grooves 60 and 62. Since linkages 50 and 52 are the same, for convenience and simplicity only the one linkage system will be described herein. As noted the linkage 50 includes link 64 and 66 that are pivotally attached to the platform by pivot 70 and the lower end of link 64 is pivotally mounted to the rail 56 by pivot 72. The opposite end of link 66 is freely supported in the groove 60 and its travel is limited by shoulder 74 formed at the end of the groove 60. The smaller links 76 and 78 being pivotally attached to each other by pivot 80 is pivotally attached to the links 64 and 66 intermediate the ends thereof by pivots 82 and 84, respectively. Link 86, which serves to assist to activate the linkages 50 and 52 when the platform 54 is positioned rearwardly, by pivotally attaching link 86 to the platform by pivot 88. Link 86 is slidably attached to the link 66 by virtue of the projection formed on pivot 84 that rides in the slot 90 formed in the link 86. Hence, when the platform is positioned rearwardly, the link 86 serves to raise the linkage 50 from the stored position shown in FIG. 7b to the deployed position shown in FIG. 7a, which is the height of the wheel wells 18.

Platform 54 may also include an extension 100 that telescopes into platform 54 via the telescoping rod 101 which is supported in the platform by any well known suitable support. The extension 100 is pivotally mounted to the link 102 and when deployed the lower end 104 rest on the rail 56 and bears against shoulder 106 to support the extension 100.

Figure 8:
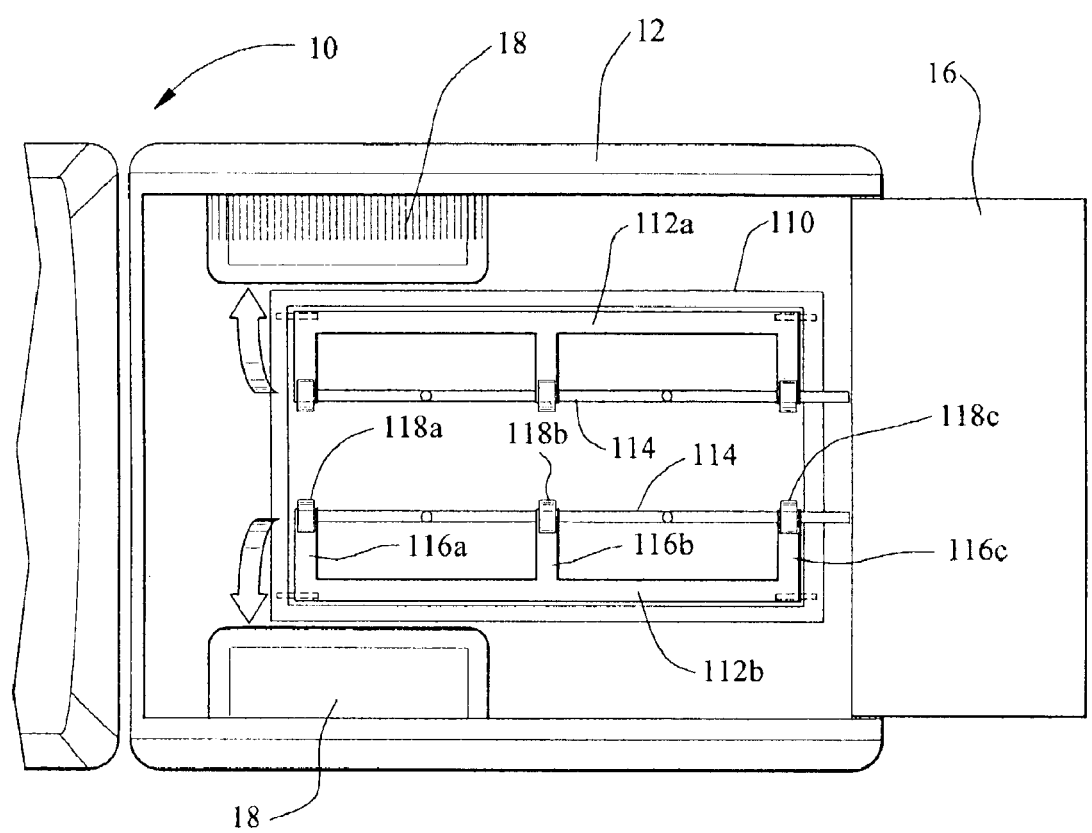
FIG. 8 is a schematic illustration of the load carrying structure of this invention with a foldable linkage system and platform where the platform does not slide.

FIG. 8 exemplifies another embodiment where the platform 110 is pivotally mounted on a pair of pivotal frames 112a and 112b supported to the parallel mounted rails 114.

The frame 112a (only one frame will be described for simplicity and convenience) carries three legs 116a, 116b and 116c that is pivotally mounted to rail 114 via the suitable pivot connections 118a, 118b and 118c respectively, so that when the platform is raised the frames 112a and 112b will rotate and move to the vertical position to hold the platform 110 at a height equal to the height of the wheel wells 18. Again, as described in connection with the other embodiments, the load resting on the platform is partially supported by the wheel wells, in addition to the frame and the width will be sufficient to carry the 4'×8' sheet material.

Figure 9:
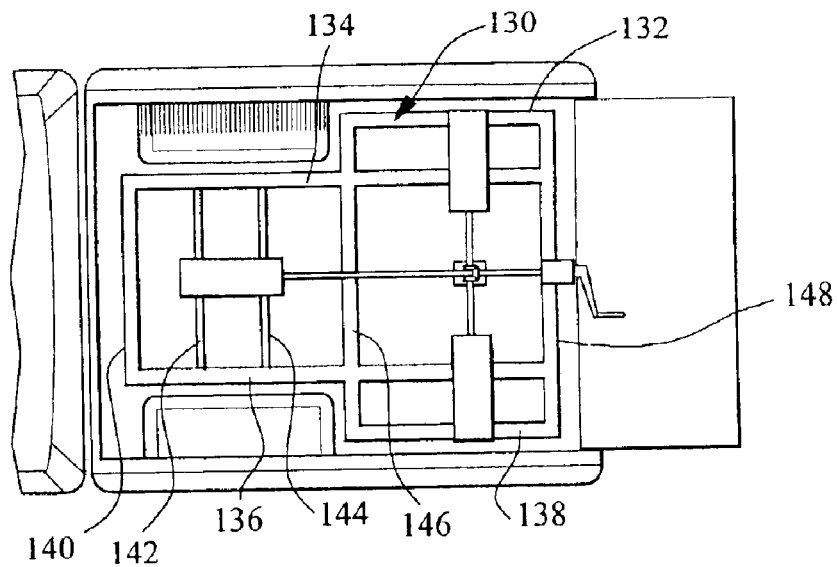
FIG. 9 is a schematic illustration of a platform similar to the platform depicted in FIG. 1 where a plurality of jacks are utilized to raise and lower the platform.

FIG. 9 is a top plan view with the platform removed to illustrate how these embodiments can employ jacks for raising the platform. In this embodiment the invention consists of a suitable frame generally illustrated by reference numeral 130 having the longitudinal bars 132, 134, 136, and 138 and the cross bars 140, 142, 144, 146 and 148 that is suitably attached to the floor of the bed 12. Mounted on the frame as shown are three (3) commercially available jacks (scissor or hydraulic or pneumatic) suitably located to distribute the load evenly and assure that the platform is relatively parallel to the floor of the bed 12.

Figure 10A:
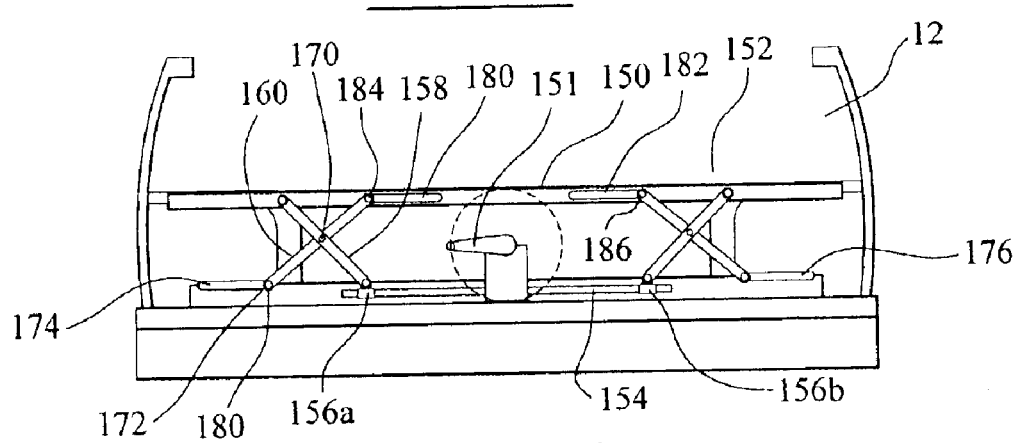
FIG. 10a is a schematic illustration of a platform of this invention in the deployed position that is foldable by a linkage system and a jack for raising and lowering the platform.
Figure 10B:
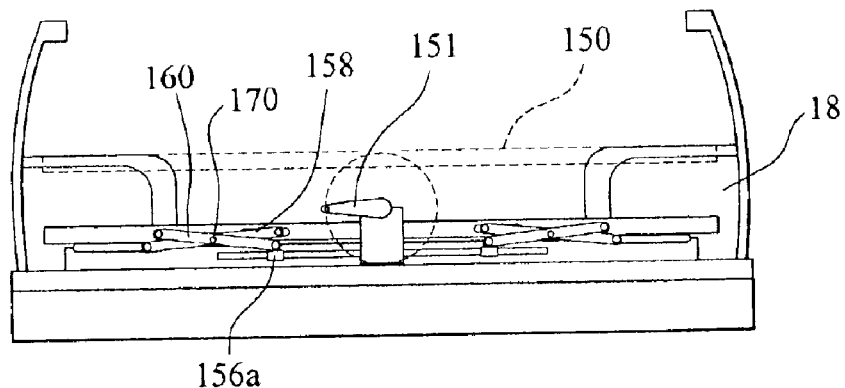
FIG. 10b is a schematic and phantom illustration of the structure depicted in FIG. 10a showing the stored position.

FIGS. 10a and 10b illustrates still another embodiment that employs a single crank 151 (similar to a scissor jack) that serves to rotate the threaded shaft 154 that translate the carriers 156a and 156b where the platform 150 is supported by the x-shaped linkage frame generally illustrated by reference numeral 152. Again only one of the frames will be described for the sake of simplicity and convenience. The frame 156a includes a first link 158 and a second link 160 pivotally supported to each other via the pivot 170. The frames 156a (four being utilized) are supported in the rail 172 which includes the slots 174 and 176. The platform 150 also carries slots 180 and 182. The upper end of link 160 is pivotally supported to the edge of the platform 150 and the link 158 carries at either end pins 184 and 186 that slide in slots 180 and 182. It is apparent from the foregoing that when the crank 151 is rotated to rotate the threaded shaft 154 to position the carriers 156a and 156b (as well as those on the opposite side, the x-shaped frame will be lifted and lowered as shown in FIGS. 10a and 10b.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a motor vehicle of the type that includes a rear portion having opposing side panels and a rear door or tail gate adapted for carrying a load, said rear portion including opposing wheel wells, a frame mounted on a floor extending between said wheel wells and from the fore and aft end of said rear portion, a plurality of jacks mounted on said frame adapted to be raised and lowered with respect to said floor, a platform having a portion extending between said opposing wheel wells and a portion extending between said opposing side panels, said platform supported to said plurality of jacks at different locations of said platform so that said platform when deployed is raised to a level of said wheel wells by said plurality of jacks whereby a portion of said load extending between said opposing side panels overlies said wheel wells so that a portion of the load is supported by said wheel wells.

2. For a motor vehicle of the type that includes a rear portion having opposing side panels and a rear door or tail gate adapted for carrying a load as claimed in claim 1 wherein at least one of said jacks is located between said opposing wheel wells and a second one of said jacks is located between said opposing side panels and downstream of said wheel wells.

3. A load carrying, movable platform capable of extending the load capacity of a motor vehicle, said movable platform disposed on a floor of a bed formed on the aft end of said motor vehicle, said bed having opposing side panels, said floor, a fore end, an aft end and a tail gate, opposing wheel wells disposed in said bed at said fore end, said platform including a planar member having at least a portion spanning said opposing side panels disposed on the floor of said bed when in the stored position, means for raising said movable platform so that said planar member is raised to a level of said wheel wells whereby a portion of a load of material that is dimensioned so as to extend substantially to said side panels rests on the wheel wells and a portion of said platform extends beyond said tail gate.

* * * * *